UNITED STATES PATENT OFFICE.

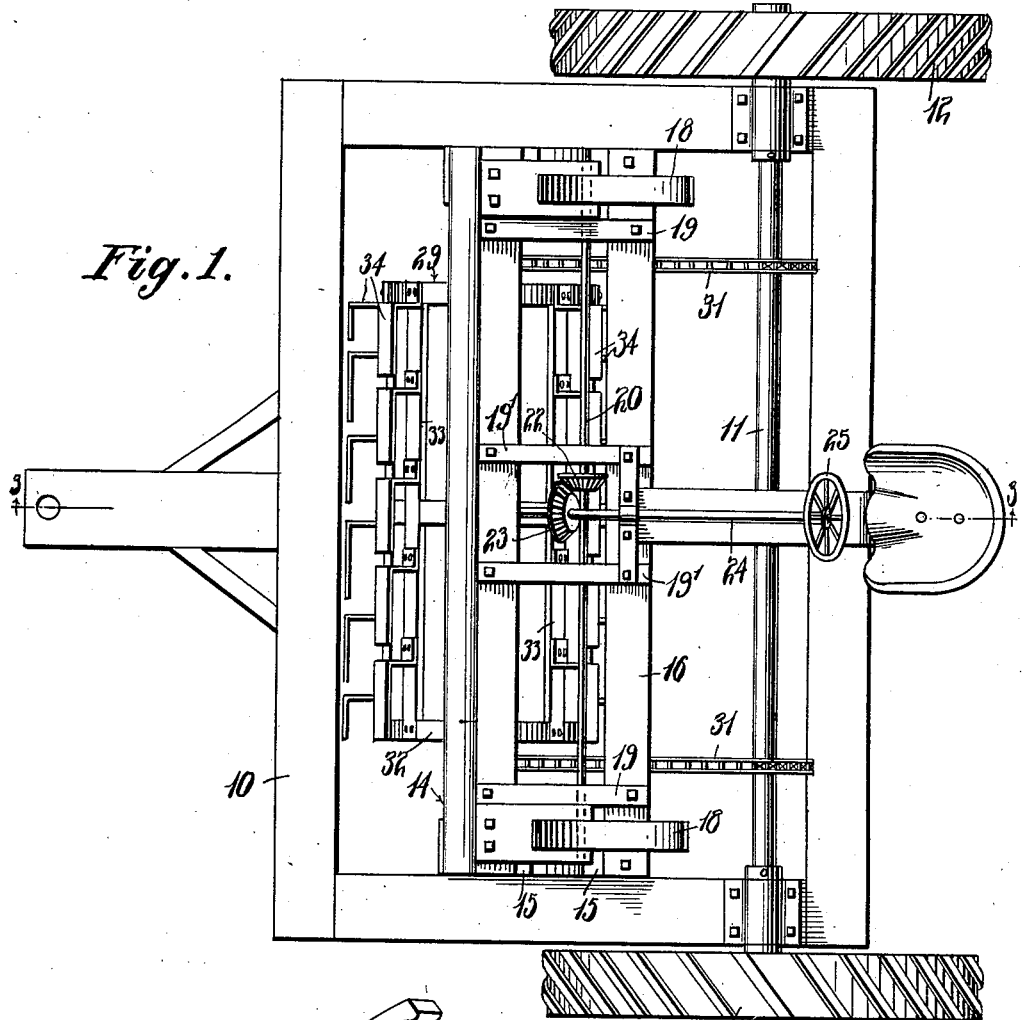

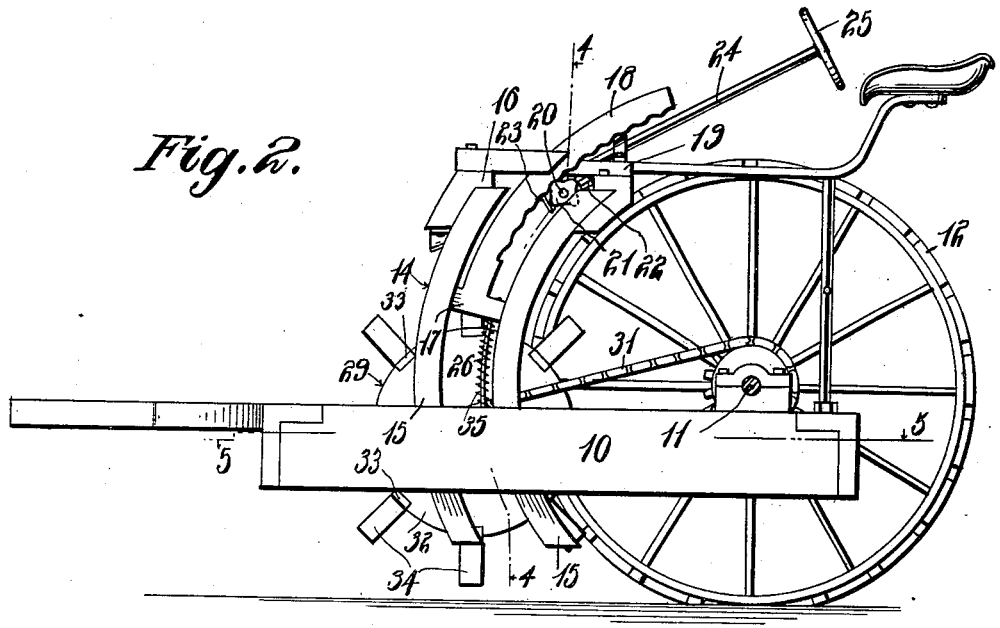
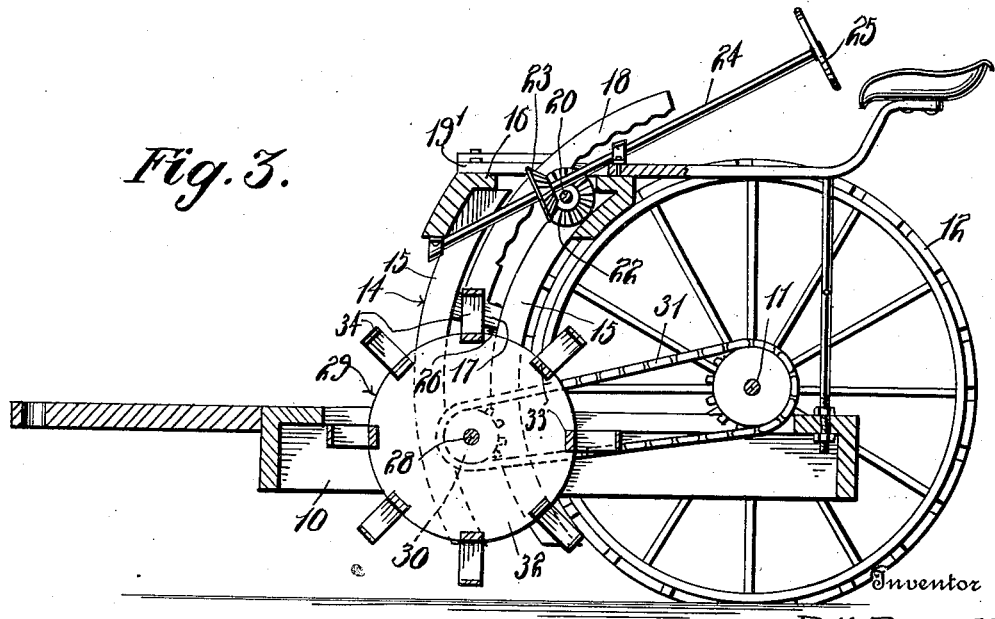

RUSH M. BENNETT, OF SUNNYSIDE, WASHINGTON.

WEEDER AND CULTIVATOR.

1,086,014.      Specification of Letters Patent.      Patented Feb. 3, 1914.

Application filed November 25, 1912. Serial No. 733,446.

*To all whom it may concern:*

Be it known that I, RUSH M. BENNETT, a citizen of the United States, residing at Sunnyside, in the county of Yakima, State of Washington, have invented certain new and useful Improvements in Weeders and Cultivators; and I do hereby declare the following to be a full, clear, and exact description of the invention, such as will enable others skilled in the art to which it appertains to make and use the same.

This invention relates to improvements in agricultural implements, and particularly to a weeding device.

The principal object of the invention is to provide a simple device of this character wherein the ground treating implement will be lifted over stones and other obstacles, without injury to the implement and without any necessity for oversight on the part of the operator.

Another object is to provide a device of this character in which the ground treating implement may be regulated and adjusted to various heights from the ground.

Other objects and advantages will be apparent from the following description and with particular reference to the accompanying drawings.

In the drawings: Figure 1 is a plan view of the machine made in accordance with my invention, Fig. 2 is a side elevation, Fig. 3 is a vertical transverse sectional view on the line 3—3 of Fig. 1, Fig. 4 is an enlarged detail view of the means for permitting the ground treating implement to raise itself over stones or other obstacles.

Referring particularly to the accompanying drawings, 10 represents a rectangular frame, said frame carrying a transverse axle 11, on which are mounted the supporting wheels 12.

Mounted on the forward end of the frame is a superstructure 14, which comprises vertical grooved guides 15, and a transverse platform 16. These guides are curved in an arc concentric with the axle 11 so that the driving chain (to which reference will be made later) will at all times have the same tension. Vertically slidable in the standards or grooved guides are the blocks 17, these blocks carrying on their upper sides the vertically extending curved rack bars 18. Mounted on the platform are the bearing blocks 19, which support the transversely extending shaft 20. On the opposite ends of said shaft are the pinions 21 which mesh with the before-mentioned racks. On the middle portion of the shaft 20 between the middle bearing blocks 19' is a beveled pinion 22, which meshes with a similar pinion 23, carried by a longitudinally extending inclined shaft 24, said shaft being provided with a hand wheel 25 for rotation to operate the shaft 20 and raise and lower the blocks 17 by means of the racks 18.

Secured to the blocks 17 are the depending bars 26 and loosely slidable vertically on these depending bars are the bearing blocks 27. Each of the blocks 27 carries one of the trunnions 28 of the ground treating implement 29, a sprocket wheel 30 being mounted rigidly on the trunnion and driven from one of the sprockets on the axle by means of the chain 31.

The ground treating implement comprises a drum 32 having the longitudinally extending strips 33 which carry the longitudinal series of angular knives 34 for engagement with the ground. As the device is moved over the ground, the sprocket and axle rotate the ground treating implement, and should the same engage a stone, the bearing block carrying the ground treating implement will slide on the depending bars and lift the ground treating implement bodily over the obstruction. By turning the hand wheel on the inclined shaft, the ground treating implement is raised and lowered to any desired position. On each of the rods 26 is a coil spring 35 which bears against the blocks 17 and 27, to hold the blocks 27 in depressed position.

What is claimed is:

1. In an agricultural machine, a wheeled frame, a superstructure carried by the frame, vertically slidable blocks carried by the superstructure, means for adjusting the blocks, depending bars carried by the blocks, bearing blocks vertically slidable on the bars, a rotatable ground treating implement journaled in the bearing blocks, and means for rotating the implement.

2. In an agricultural machine, a wheeled frame, a superstructure carried by the frame, vertically slidable blocks carried by the superstructure, means for adjusting the blocks, depending bars carried by the blocks, bearing blocks vertically slidable on the bars, a rotatable ground treating implement journaled in the bearing blocks, means for rotating the implement, and resilient means disposed between the first named blocks and the bearing blocks for holding the bearing blocks in yieldingly depressed positions.

In testimony whereof, I affix my signature, in the presence of two witnesses.

RUSH M. BENNETT.

Witnesses:
 A. LOBEN,
 J. H. MARTIN.

Copies of this patent may be obtained for five cents each, by addressing the "Commissioner of Patents, Washington, D. C."